(No Model.)

L. C. EVANS.
PLANTER.

No. 536,330. Patented Mar. 26, 1895.

WITNESSES:
Frank M. Burnham.
Chas. J. Welch.

INVENTOR
Louis C. Evans
BY
ATTORNEY

THE NORRIS PETERS CO., PHOTO-LITHO., WASHINGTON, D. C.

UNITED STATES PATENT OFFICE.

LOUIS C. EVANS, OF SPRINGFIELD, OHIO.

PLANTER.

SPECIFICATION forming part of Letters Patent No. 536,330, dated March 26, 1895.

Application filed January 17, 1895. Serial No. 535,292. (No model.)

*To all whom it may concern:*

Be it known that I, LOUIS C. EVANS, a citizen of the United States, residing at Springfield, in the county of Clark and State of Ohio, have invented certain new and useful Improvements in Planters, of which the following is a specification.

My invention relates to improvements in planters, and it especially relates to the seed dropping devices used therein.

Figure 1:
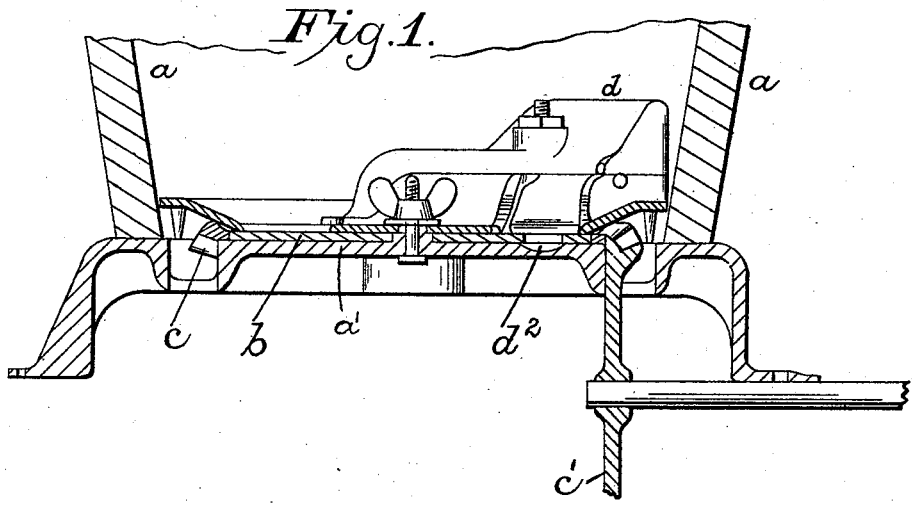
Figure 3:
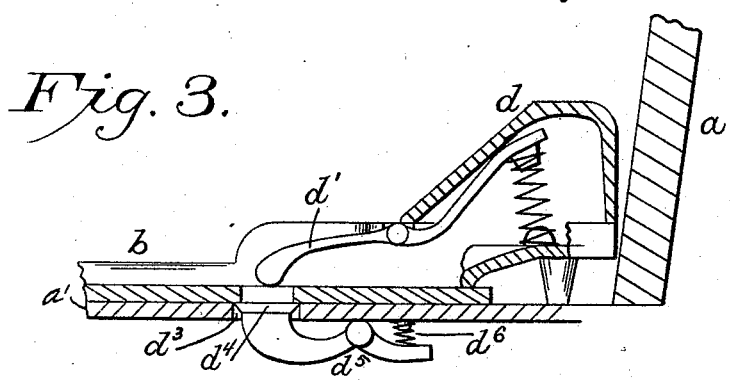
Figure 2:
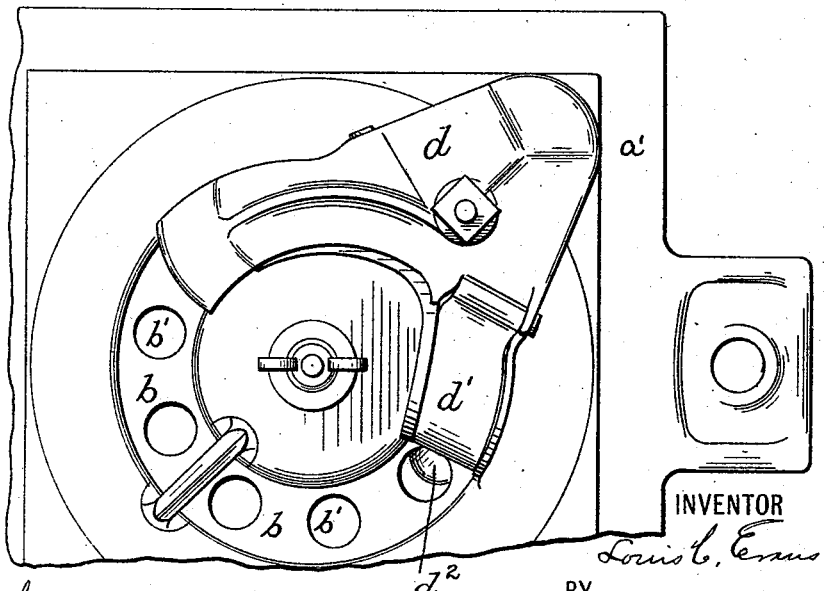

In the accompanying drawings, Figure 1 is a sectional elevation showing a portion of an ordinary planter hopper. Fig. 2 is a partial plan view of the same, and Fig. 3 is a sectional elevation on a different line from Fig. 1 and showing a modification.

Like parts are represented by similar letters of reference in the several views.

Planters, and especially corn planters now in general use, embody movable plates having a series of holes to carry the seed from the hopper to the discharge opening. In these devices, in which a thin plate adapted to convey a single kernel of corn is employed, it frequently happens that a kernel of unusual thickness is lifted out of the opening by the separating device used to separate the kernels in the hopper from those in the plate. I have sought to overcome this difficulty and produce a dropping device more effectual and reliable in its operation than heretofore employed by the invention described herein.

In the said drawings, $a\ a$ represent an ordinary grain hopper, such as is used on corn planters of modern construction.

$b$ is a seed plate provided with a series of openings $b'$, said plate being supported at the bottom of the hopper and driven in any suitable manner; for instance, by beveled gears $c$ and $c'$. As the plate is moved a portion of it is exposed to the grain in the hopper, as shown in Fig. 2; the remaining part of the plate being protected by a housing $d$, under which is located the discharge opening.

A yielding cutoff or separating device $d'$ is placed in the housing so as to bear on the plate and move the surplus grain from the openings as each opening passes under said housing. Now, to prevent the removal of grains of unusual thickness by this cutoff or separating device, I employ means by which the kernel is permitted to yield through the opening in the plate just as it is passing under the cutoff, and thus prevent the dislodgment of unusually thick grains or the breaking of them. In Fig. 1 I have shown the most simple and probably the best method of accomplishing this. Immediately under the cutoff I employ a recess or depression $d^2$ in the bottom of the hopper on which the plate $b$ is adapted to travel. This recess is preferably rounded at the bottom and is of a diameter equal to or slightly larger than the respective openings $b'$ in the plate $b$, which pass over the same. The construction is such that as the respective kernels located in the openings $b'$ begin to pass under the cutoff $d'$, they are also allowed to yield or recede slightly from the cutoff, which they do by gravity and by passing momentarily into the recess $d^2$; the recess being of such shape that they are immediately brought back to their proper position in the openings as they pass under the cutoff. In Fig. 3 I have shown means for accomplishing the same result, which are slightly different. In this case, instead of a recess $d^2$, an opening $d^3$ is provided, which extends entirely through the bottom plate $a'$ of the hopper; said opening being normally closed by the yielding plate $d^4$, which may be supported on a pivoted arm $d^5$, so as to be pressed continually upward against the revolving plate $b$ by a spring $d^6$. A kernel of unusual thickness being in any opening of the revolving plate as it passes under the cutoff $d'$, will cause the plate $d^4$ to yield slightly downwardly so as to permit the kernel to pass under the cutoff. At the same time it will not interfere with the complete separation of the kernels in the hopper from those in the opening.

As before stated this improvement is especially adapted for use with thin dropping plates which are intended to drop but a single kernel at a time. It is obvious, however, that it may be employed with any form of plate designed to accommodate any number of kernels, and by its use the number of kernels dropped from each opening will be much more uniform and the breakage of kernels very much less frequent than when such improvement is not employed.

Having thus described my invention, I claim—

1. In a dropping device for planters, a seed plate having a series of openings therein, a stationary support under said plate, and a cutoff above said plate, and a recess or opening under said cutoff to permit the seed kernels to yield through said plate when passing under said cutoff, substantially as specified.

2. The combination with a hopper, a bottom plate therein, a seed plate in said hopper having a series of openings, a housing over a portion of said plate, and a cutoff in said housing, of a depression under said seed plate to permit the seed kernels to drop slightly in passing under said cutoff, substantially as specified.

3. The combination with a hopper having a bottom, and a seed plate on said bottom having perforations, as described, of a cutoff over said seed plate, and a recessed opening in the hopper bottom opposite said cutoff, said recessed opening being curved or beveled as described, substantially as specified.

4. The combination with a hopper having a bottom therein, a movable plate supported in said hopper and provided with openings, a cutoff over said plate under which the openings are adapted to be brought by the movement of said plate, and a recessed opening in the bottom of said hopper in line with said openings in said plate and opposite to said cutoff, substantially as and for the purpose specified.

In testimony whereof I have hereunto set my hand this 9th day of January, A. D. 1895.

LOUIS C. EVANS.

Witnesses:
PAUL A. STALEY,
CHAS. I. WELCH.